(12) United States Patent
Langhammer

(10) Patent No.: US 7,587,443 B1
(45) Date of Patent: Sep. 8, 2009

(54) DIGITAL SIGNAL PROCESSOR WITH EFFICIENT MULTI-MODAL MULTIPLIER

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 711 days.

(21) Appl. No.: 10/807,796

(22) Filed: Mar. 23, 2004

(51) Int. Cl.
G06F 7/52 (2006.01)

(52) U.S. Cl. .................. 708/625; 708/620; 708/628

(58) Field of Classification Search .......... 708/620–632
See application file for complete search history.

(56) References Cited

U.S. PATENT DOCUMENTS

| | | | |
|---|---|---|---|
| 3,752,971 A * | 8/1973 | Calhoun et al. ............. 708/626 |
| 4,754,421 A * | 6/1988 | Bosshart .................... 708/625 |
| 5,293,558 A * | 3/1994 | Narita et al. ............... 708/605 |
| 5,446,651 A * | 8/1995 | Moyse et al. ............... 708/630 |
| 5,579,253 A * | 11/1996 | Lee et al. ................... 708/625 |
| 6,460,064 B1 * | 10/2002 | Lee .......................... 708/518 |
| 6,484,194 B1 * | 11/2002 | Henderson et al. .......... 708/627 |
| 6,523,055 B1 * | 2/2003 | Yu et al. .................... 708/603 |
| 6,693,455 B2 * | 2/2004 | Langhammer et al. ........ 326/40 |

* cited by examiner

Primary Examiner—Lewis A Bullock, Jr.
Assistant Examiner—Michael Yaary
(74) Attorney, Agent, or Firm—Townsend and Townsend and Crew LLP

(57) ABSTRACT

A digital signal processor architecture allows the digital signal processor to be used efficiently for multiplying words which are longer than the word length for which the architecture is primarily designed. The multiplication unit has a register file which is adapted to store data words of a first length, and a multiplier which is adapted to multiply together data words of a second length, the second length being twice the first length. In a first mode, the architecture multiplies data words of the first length, by extending them to the second length. In a second mode, the architecture multiplies data words of the second length, by retrieving each of the data words in two parts, each part being of the first length.

35 Claims, 3 Drawing Sheets

DIGITAL SIGNAL PROCESSOR WITH EFFICIENT MULTI-MODAL MULTIPLIER

TECHNICAL FIELD OF THE INVENTION

This invention relates to a digital signal processor, and in particular to multiplier circuitry within a digital signal processor.

BACKGROUND OF THE INVENTION

High performance digital signal processing applications can conveniently be implemented using programmable logic devices. Therefore, Stratix™ programmable logic devices from Altera Corporation include DSP blocks, in the form of high-performance embedded DSP units, which are optimized for applications such as rake receivers, orthogonal frequency division multiplexing transceivers, and image processing applications.

One defining feature of a DSP block is the bit length of the words which it handles. For example, a 16 bit DSP architecture stores data in the form of 16 bit words, and allows easy manipulation of such 16 bit words.

However, although a 16 bit architecture is sufficient for many applications, and therefore is in common use, there are a significant number of applications for which a 16 bit architecture is insufficient. For example, when using a digital signal processor to perform inversion of a matrix, the use of a 16 bit architecture may be insufficient to calculate the coefficients of the resulting matrix with the required accuracy.

In such circumstances, a floating point DSP processor can be used to obtain the result to the required accuracy, but such processors are expensive and inconvenient. Alternatively, a 16 bit architecture can be used to perform the required operations, but this is a slow process. To illustrate this, two multiplicands, each of up to 32 bits, can each be divided into two 16 bit words. The two words forming the first multiplicand must then be multiplied in turn by the two words forming the second multiplicand, so that four multiplication operations are required. The result of multiplying the most significant bits of the two multiplicands must then be shifted 32 bit positions to the left, while the two results of multiplying the most significant bit from one multiplicand with the least significant bits from the other multiplicand must be added together and shifted 16 bits to the left. Finally, these intermediate results must be added together to form the final result. This means that, if a 16 bit multiplication occupies one clock cycle of the digital signal processor, a 32 bit multiplication occupies nine clock cycles or more, depending on the data moving and shifting capabilities of the digital signal processor.

SUMMARY OF THE INVENTION

According to the present invention, there is provided a digital signal processor architecture, and a method of operation of such an architecture, which allows the digital signal processor to be used efficiently for multiplying words which are longer than the word length for which the architecture is primarily designed.

According to an aspect of the invention, the multiplication unit has a register file which is adapted to store data words of a first length, and a multiplier which is adapted to multiply together data words of a second length, the second length being twice the first length. In a first mode, the architecture multiplies data words of the first length, by extending them to the second length. In a second mode, the architecture multiplies data words of the second length, by retrieving each of the data words in two parts, each part being of the first length.

The digital signal processor architecture of the present invention may form part of an embedded digital signal processor block in a programmable logic device, or may form part of a dedicated digital signal processor integrated circuit.

DETAILED DESCRIPTION OF PREFERRED EMBODIMENTS

Figure 1:
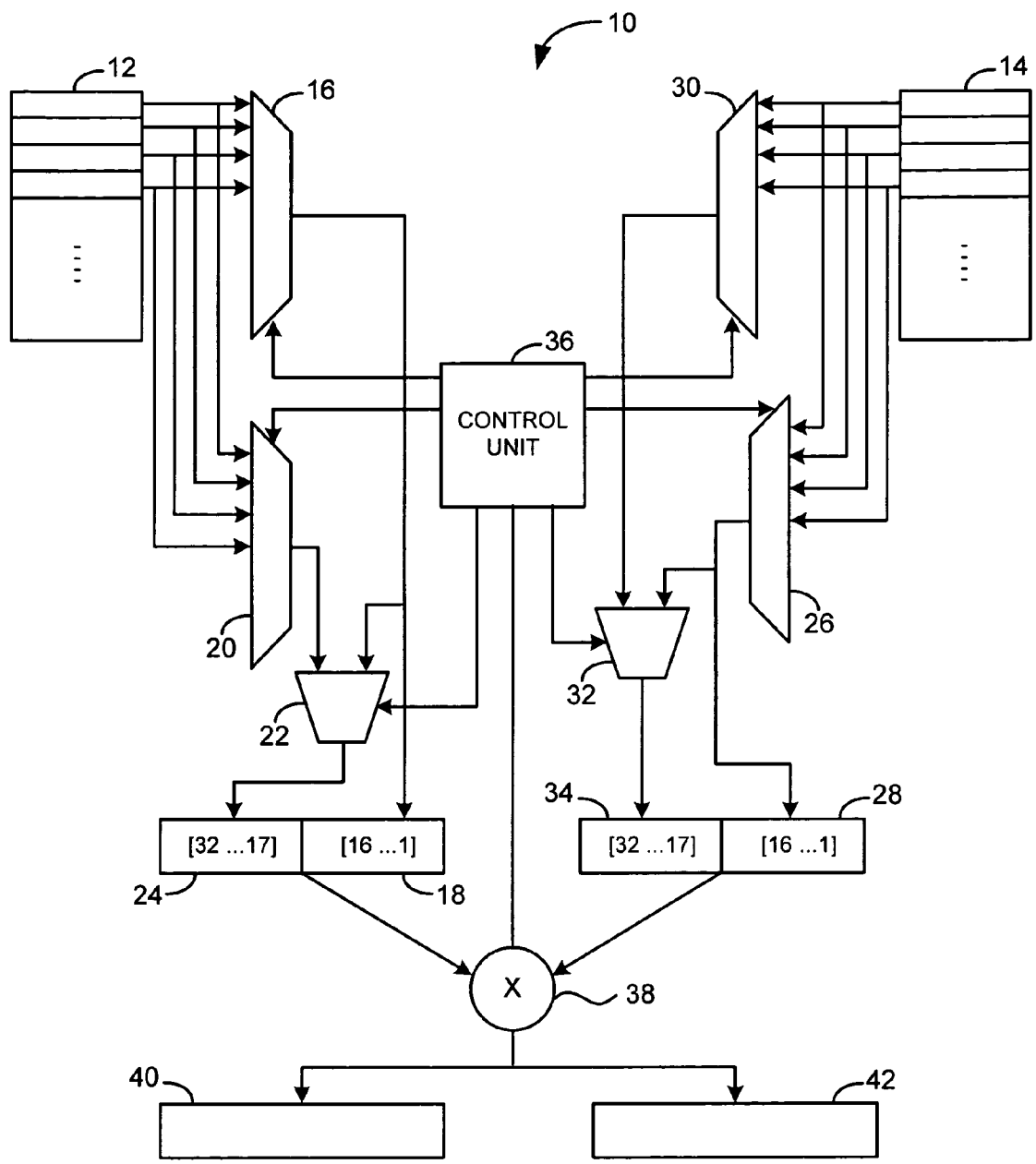
FIG. 1 is a block schematic diagram of a multiplication unit in a digital signal processing block in accordance with the present invention.

FIG. 1 is a block schematic diagram showing a multiplication unit in a digital signal processor according to the present invention. Data, for use in the multiplication unit 10, can be stored in registers within register files 12, 14. For ease of illustration, these two register files 12, 14 are shown separately, and in the following description it will be assumed that the first multiplicand is stored in the first register file 12, while the second multiplicand is stored in the second register file 14. In practice, in one preferred embodiment of the invention, there is a single dual ported register file, in which both multiplicands are stored, and which allows two registers to be read out at the same time.

The registers of the first register file 12 are connected through a first multiplexer 16, whose output is supplied to a first multiplication register 18. The registers of the first register file 12 are also connected to a second multiplexer 20. The output of the second multiplexer 20, and the most significant bit of the output of the first multiplexer 16, are connected to a third multiplexer 22, and the output of the third multiplexer 22 is supplied to a second multiplication register 24.

Similarly, the registers of the second register file 14 are connected to a fourth multiplexer 26, whose output is supplied to a third multiplication register 28. The registers of the second register file 14 are also connected to a fifth multiplexer 30, and the output of the fifth multiplexer 30 and the most significant bit of the output of the fourth multiplexer 26 are connected to a sixth multiplexer 32, whose output is supplied to a fourth multiplication register 34.

The multiplexers 16, 20, 22, 26, 30, 32 all operate under the control of a control unit 36, as will be described in more detail below.

The contents of the first multiplication register 18, second multiplication register 24, third multiplication register 28 and fourth multiplication register 34 are supplied to a multiplier block 38, the outputs of which are supplied to two 32 or more bit accumulation units 40, 42.

FIG. 1 shows a 16 bit architecture. That is, each of the registers in the register files 12, 14 is 16 bits wide, while the various datapaths and the multiplication registers 18, 24, 28, 34 are each also 16 bits wide. However, the multiplier 38 is a 32-bit multiplier, that is, it is able to multiply two 32 bit numbers, and the accumulators 40, 42 are 32 bits wide. Although the invention is described based upon a 16 bit architecture, the same principle can be applied to other architectures. For example, an 18 bit DSP architecture can be used to multiply together two 36 bit numbers, or a 32 bit architecture can be used to multiply together two 64 bit numbers.

Figure 2:
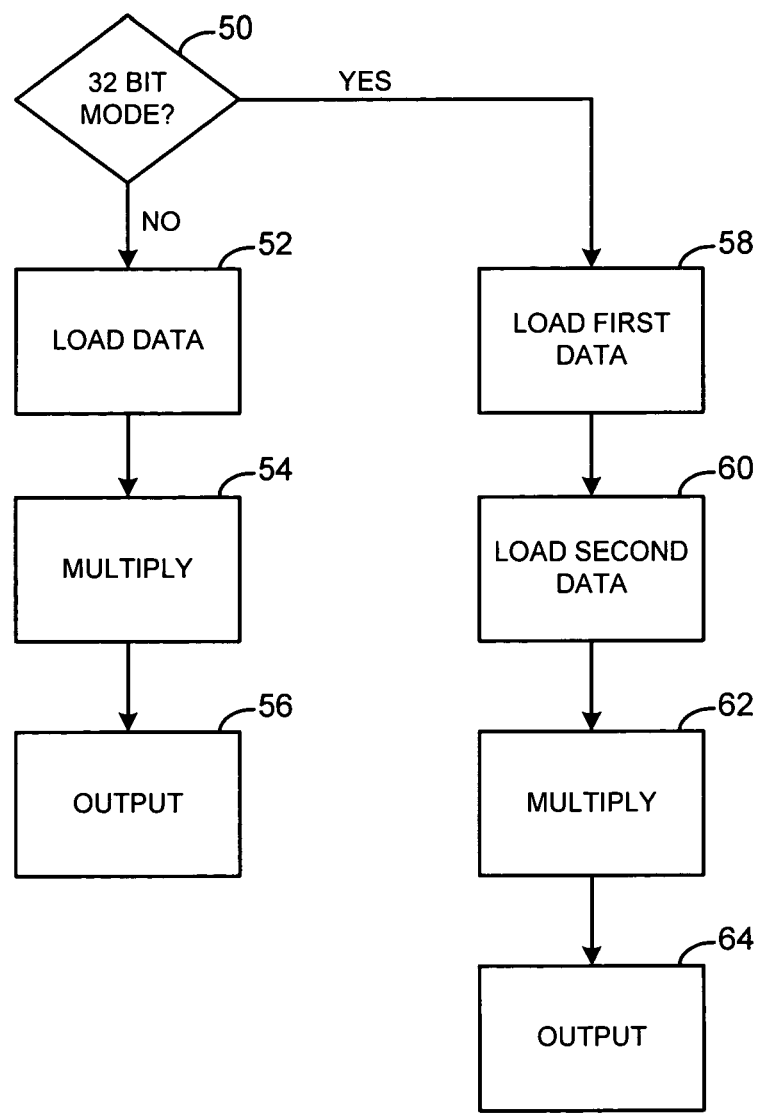
FIG. 2 is a flow chart showing a method of operation of the multiplication unit of FIG. 1.

FIG. 2 is a flow chart showing a method of operation of the multiplication unit 10.

Initially, in step 50, it is determined whether the unit is operating in a 32 bit multiplication mode. If not, that is, if the unit is operating in a 16 bit multiplication mode, the process passes to step 52.

In step 52, the data is loaded into the multiplication registers. More specifically, the first multiplicand is loaded from a register in the first register file 12, and the first multiplexer 16 is controlled by the control unit 36 such that this data word is loaded into the first multiplication register 18. In 16 bit mode, there is no need to retrieve a second data word from the register file 12, and so the third multiplexer 22 is controlled such that the most significant bit of the first multiplicand is passed through from the first multiplexer 16. This bit value is then stored in each of the 16 bit positions in the second multiplication register 24. Thus, the first and second multiplication registers 18, 24 together contain a sign extended version of the first multiplicand.

At the same time, the second multiplicand is loaded from the intended register in the second register file 14 through the fourth multiplexer 26 into the third multiplication register 28. As before, the sixth multiplexer 32 is controlled so that the most significant bit of the data loaded into the third multiplication register 28 is also loaded into each bit position in the fourth multiplication register 34.

As described above, sign extended versions of the first and second 16 bit multiplicands are stored, with the second multiplication register 24 being filled with the most significant bit of the first multiplicand, and the fourth multiplication register 34 being filled with the most significant bit of the second multiplicand. This will allow the multiplier to produce a signed result of the 16 bit multiplication.

In other embodiments of the invention, the second multiplication register 24 and the fourth multiplication register 34 could each be filled with zeroes. In this case, the multiplication will produce an unsigned result.

Alternatively, the multiplier 38 could be modified so that, in this 16 bit multiplication mode, it can produce a signed result from the product of the first and second multiplicands, irrespective of the contents of the second multiplication register 24 and the fourth multiplication register 34.

The principle is that, when the contents of the first and second multiplication registers 18, 24 are multiplied by the contents of the third and fourth multiplication registers 28, 34, it remains easily possible to obtain an output which is the product of the first and second multiplicands.

In a further alternative embodiment of the invention, the first 16 bit multiplicand could be stored in the second multiplication register 24, and the second 16 bit multiplicand could be stored in the fourth multiplication register 34. In this case, the first multiplication register 18 and the third multiplication register 28 should be filled with zeroes, again so that, when the contents of the first and second multiplication registers 18, 24 are multiplied by the contents of the third and fourth multiplication registers 28, 34, it remains easily possible to obtain an output which is the product of the first and second multiplicands.

In this case, unlike the other cases discussed above, the desired multiplication result will appear as the upper 32 bits of the multiplier output.

In step 54 of the process, the data stored in the first and second multiplication registers 18, 24 is multiplied by the data stored in the third and fourth multiplication registers 28, 34, in the 32 bit multiplication unit 38.

In step 56 of the process, the multiplier 38 outputs the multiplication result, under the control of the control unit 36. In the preferred embodiment of the invention, in which the first and second multiplicands are stored in the first and third multiplication registers respectively, it is only the 32 bit result obtained from multiplying the contents of the first multiplication register 18 and the third multiplication register 28 which has any significance. This can be supplied to one or both of the accumulation units 40, 42, depending upon a control signal from the control unit 36.

However, in the alternative embodiment described above, in which the first and second multiplicands are stored in the second and fourth multiplication registers respectively, the desired multiplication result will appear as the upper 32 bits of the multiplier output, and so these bits must be routed to one or both of the accumulation units 40, 42.

If instead it is determined in step 50 that the device is operating in a 32 bit multiplication mode, then an additional step is required to load the data to be multiplied.

Thus, in step 58, the first part of the data to be multiplied is loaded. In step 58, the 16 bit data word forming the most significant bits of the first 32 bit multiplicand is loaded from the respective register of the first register file 12, through the second multiplexer 20, and the third multiplexer 22 is controlled so that this data word is stored in the second multiplication register 24. At the same time, the data word forming the 16 most significant bits of the second multiplicand is loaded from a register in the second register file 14, through the fifth multiplexer 30 and the sixth multiplexer 32 is controlled so that this data word is stored in the fourth multiplication register 34.

This process occupies one clock cycle and, in a second clock cycle in step 60, the data words representing the least significant bits of the two multiplicands are loaded. Thus, the data word forming the least significant bits of the first multiplicand is loaded from a register in the register file 12 through the first multiplexer 16 into the first multiplication register 18. At the same time, the 16 bit word forming the least significant bits of the second multiplicand is loaded from a register in the second register file 14 through the fourth multiplexer 26 into the third multiplication register 28.

In one preferred embodiment of the invention, the two 16 bit data words forming the 32 bit first multiplicand will usually be stored in adjacent registers in the register file 12, while the two 16 bit data words forming the 32 bit second multiplicand will usually be stored in adjacent registers in the register file 14, although this is not necessarily the case.

Then, as before, in step 62, the contents of the first and second multiplication register 18, 24 are multiplied by the contents of the third and fourth multiplication registers 28, 34 in the multiplier 38. Again, as before, under the control of the control unit 36, the multiplication result is supplied to the accumulation units 40, 42. In this case, the 64 bit multiplication result may be divided between the accumulated units 40, 42, with the 32 most significant bits in one accumulation unit and the 32 least significant bits in the other accumulation unit. Alternatively, in some situations it may be sufficient to output only the 32 most significant bits, or the 32 least significant bits, to one accumulation unit 40, 42 or the other.

Although the invention has been described herein with reference to one preferred embodiment, it will be appreciated that other implementations are also possible.

Figure 3:
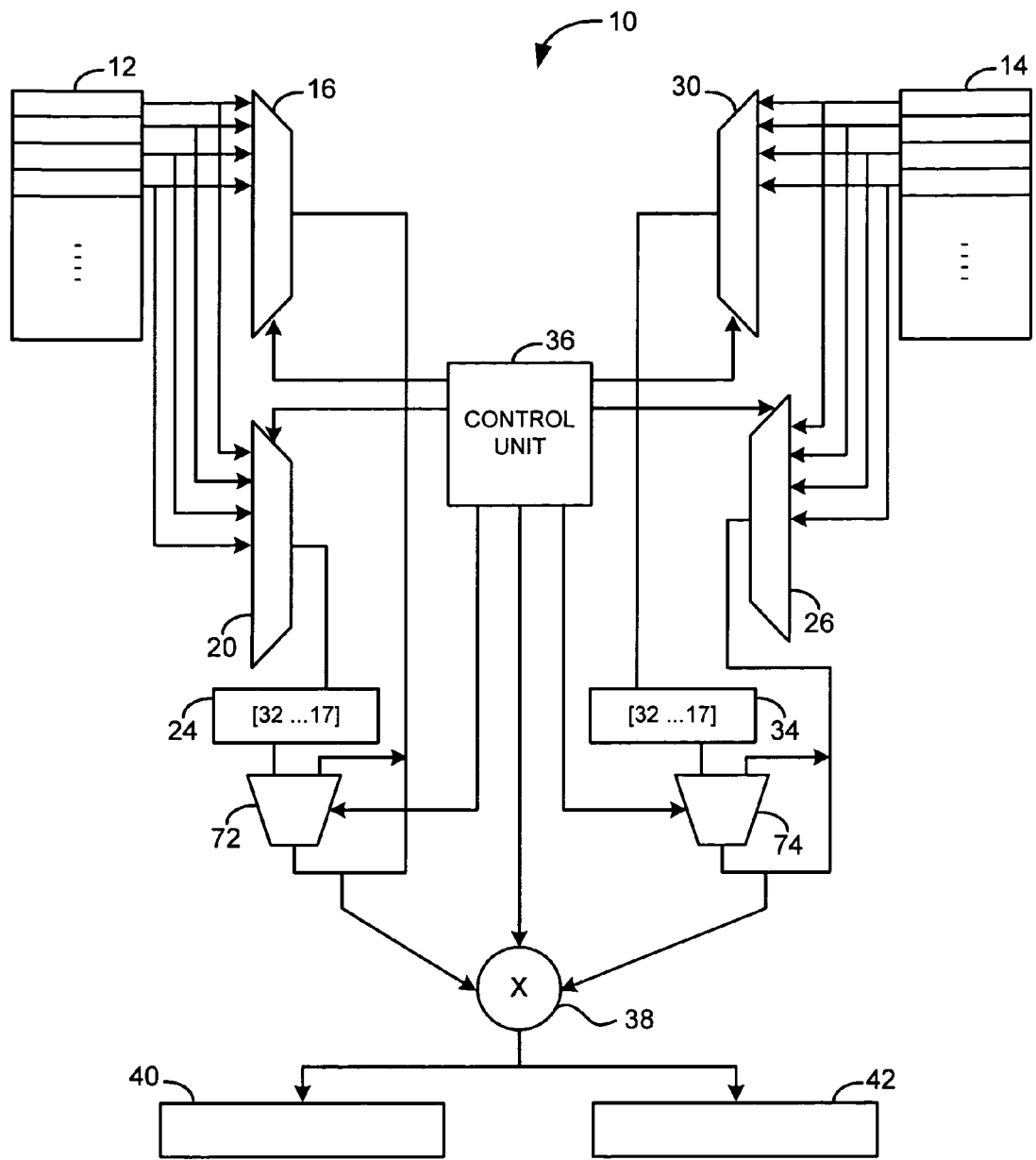
FIG. 3 is a block schematic diagram of a multiplication unit in a digital signal processing block in accordance with an alternative embodiment of the present invention.

For example, FIG. 3 shows an alternative embodiment of the invention, in which the first and third multiplication registers 18, 28 are removed, and the multiplexers 22, 32 are replaced by multiplexers 72, 74 positioned on the outputs of the second and fourth multiplication registers 24, 34 respectively.

In this alternative embodiment of the invention, in the 16 bit multiplication mode, the first and second multiplicands are loaded directly into the 16 least significant bits of the two respective 32 bit inputs of the multiplier 38, while the multiplexers 72, 74 are controlled so that the most significant bits of these two multiplicands are repeated in the respective 16 most significant bits of the two multiplier inputs.

In the 32 bit multiplication mode, the 16 bit words forming the most significant bits of the two multiplicands are loaded into the multiplication registers 24, 34. Then, in the next cycle, the 16 bit words forming the least significant bits of the two multiplicands are loaded directly into the multiplier 38, while the multiplexers 72, 74 are controlled so that the 16 bit words forming the most significant bits of the two 32 bit multiplicands are also loaded into the multiplier 38 from the registers 24, 34.

The multiplier 38 can then multiply the two 32 bit multiplicands.

The invention therefore provides an architecture which allows a multiplication to be carried out efficiently, even when the multiplicands are up to twice the length of the stored data words.

The invention claimed is:

1. A multiplication circuit comprising:
   a 2N-bit multiplier, wherein the multiplication circuit has a first short word length multiplication mode and a second long word length multiplication mode, wherein a short word length is N and a long word length is 2N, wherein N is an integer;
   a first register that stores N bits and that has an output coupled with a first 2N-bit input of the 2N-bit multiplier;
   a second register that stores N bits and that has an output coupled with a second 2N-bit input of the 2N-bit multiplier;
   a first and a second 2N-bit accumulation unit, each having an input connected to an output of the 2N-bit multiplier, wherein:
   in the first mode for multiplying two N-bit numbers,
      a first long word length multiplicand is formed at the first 2N-bit input from a first short word length multiplicand stored in the first register,
      a second long word length multiplicand is formed at the second 2N-bit input from a second short word length multiplicand stored in the second register, and
      the first and second long word length multiplicands are multiplied together using the 2N-bit multiplier to form a 4N-bit result that includes the product of the first and second short word length multiplicands; and
   in the second mode for multiplying two 2N-bit numbers,
      a third long word length multiplicand is formed at the first 2N-bit input from a first pair of short word length words, wherein a first word of the first pair is stored in the first register,
      a fourth long word length multiplicand is formed at the second 2N-bit input from a second pair of short word length words, wherein a first word of the second pair is stored in the second register, and
      subsequently the third and fourth long word length multiplicands are multiplied together using the 2N-bit multiplier to form a 4N-bit result.

2. A multiplication circuit as claimed in claim 1, wherein:
   in the first mode, the first long word length multiplicand is formed as a sign extended version of the first short word length multiplicand, and the second long word length multiplicand is formed as a sign extended version of the second short word length multiplicand.

3. A multiplication circuit as claimed in claim 1, wherein:
   in the first mode, the first long word length multiplicand is formed from the first short word length multiplicand plus zeroes as the most significant bits, and the second long word length multiplicand is formed from the second short word length multiplicand plus zeroes as the most significant bits, such that the multiplication result includes an unsigned product of the first and second short word length multiplicands.

4. A multiplication circuit as claimed in claim 1, wherein:
   in the first mode, the first long word length multiplicand is formed from the first short word length multiplicand plus zeroes as the least significant bits, and the second long word length multiplicand is formed from the second short word length multiplicand plus zeroes as the least significant bits, such that upper bits of the multiplication result contain the product of the first and second short word length multiplicands.

5. A multiplication circuit as claimed in claim 1, wherein:
   in the second mode, second words of the first and second pairs of short word length words are stored in respective registers, before the third and fourth long word length multiplicands are multiplied together.

6. A multiplication circuit as claimed in claim 1, comprising a register file, from which the first and second short word length multiplicands, and the first and second pairs of short word length words, can be retrieved.

7. A multiplication circuit as claimed in claim 6, wherein the register file is a dual ported register file, such that:
   in the first mode, the first and second short word length multiplicands can be retrieved at the same time, and
   in the second mode, first words of the first and second pairs of short word length words can be retrieved at a first time, and second words of the first and second pairs of short word length words can be retrieved at a second time.

8. A multiplication circuit as claimed in claim 1, further comprising first and second long word length accumulators, for receiving the multiplication results.

9. A multiplication circuit as claimed in claim 8, wherein, in the second mode, the result of multiplying together the third and fourth long word length multiplicands can be divided between the first and second long word length accumulators.

10. A multiplication circuit as claimed in claim 8, wherein, in the second mode, a selected part of the result of multiplying together the third and fourth long word length multiplicands can be stored in a selected one of the first and second long word length accumulators.

11. A multiplication circuit as claimed in claim 1, wherein the short word length is 16 bits and the long word length is 32 bits.

12. A multiplication circuit as claimed in claim 1, wherein the short word length is 18 bits and the long word length is 36 bits.

13. A multiplication circuit as claimed in claim 1, comprising a multiplier, for multiplying together the first and second short word length multiplicands in the first mode, and for multiplying together the third and fourth long word length multiplicands in the second mode, wherein:

in the first mode, the first long word length multiplicand is formed from the first short word length multiplicand plus zeroes as the most significant bits, and the second long word length multiplicand is formed from the second short word length multiplicand plus zeroes as the most significant bits, and the multiplier is adapted to produce a signed product of the first and second short word length multiplicands as a multiplication result, and wherein:

in the second mode, the multiplier is adapted to produce a signed product of the third and fourth long word length multiplicands as a multiplication result.

14. A method of operating a multiplication circuit comprising a 2N-bit multiplier and having a first short word length multiplication mode and a second long word length multiplication mode, wherein a short word length is N and a long word length is 2N, wherein N is an integer, and wherein the multiplication circuit further comprises a first register that stores N bits and that has an output coupled with a first 2N-bit input of the 2N-bit multiplier and a second register that stores N bits and that has an output coupled with a second 2N-bit input of the 2N-bit multiplier, the method comprising:

in the first mode for multiplying two N-bit numbers,
forming a first long word length multiplicand at the first 2N-bit input from a first short word length multiplicand stored in the first register,
forming a second long word length multiplicand at the second 2N-bit from a second short word length multiplicand stored in the second register, and
using the 2N-bit multiplier to multiply together the first and second long word length multiplicands to form a 4N-bit result that includes the product of the first and second short word length multiplicands, and in the second mode for multiplying two 2N-bit numbers,
forming a third long word length multiplicand at the first 2N-bit input from a first pair of short word length words, wherein a first word of the first pair is stored in the first register,
forming a fourth long word length multiplicand at the second 2N-bit input from a second pair of short word length words, wherein a first word of the second pair is stored in the second register, and
subsequently multiplying together the third and fourth long word length multiplicands using the 2N-bit multiplier to form a 4N-bit result.

15. A method as claimed in claim 14, comprising:
in the first mode, forming the first long word length multiplicand as a sign extended version of the first short word length multiplicand, and forming the second long word length multiplicand as a sign extended version of the second short word length multiplicand.

16. A method as claimed in claim 14, comprising:
in the first mode, forming the first long word length multiplicand from the first short word length multiplicand plus zeroes as the most significant bits, and forming the second long word length multiplicand from the second short word length multiplicand plus zeroes as the most significant bits.

17. A method as claimed in claim 14, comprising:
in the first mode, forming the first long word length multiplicand from the first short word length multiplicand plus zeroes as the least significant bits, and forming the second long word length multiplicand from the second short word length multiplicand plus zeroes as the least significant bits.

18. A method as claimed in claim 14, comprising:
in the second mode, storing second words of the first and second pairs of short word length words in respective registers, before the third and fourth long word length multiplicands are multiplied together.

19. A method as claimed in claim 14, comprising retrieving the first and second short word length multiplicands, and the first and second pairs of short word length words, from a register file.

20. A method as claimed in claim 19, wherein the register file is a dual ported register file, such that:
in the first mode, the first and second short word length multiplicands can be retrieved at the same time, and
in the second mode, first words of the first and second pairs of short word length words can be retrieved at a first time, and second words of the first and second pairs of short word length words can be retrieved at a second time.

21. A method as claimed in claim 14, further comprising selectively storing the multiplication results in first and second long word length accumulators.

22. A method as claimed in claim 21, comprising, in the second mode, dividing the result of multiplying together the third and fourth long word length multiplicands between the first and second long word length accumulators.

23. A method as claimed in claim 21, comprising, in the second mode, storing a selected part of the result of multiplying together the third and fourth long word length multiplicands in a selected one of the first and second long word length accumulators.

24. A method as claimed in claim 14, wherein the short word length is 16 bits and the long word length is 32 bits.

25. A method as claimed in claim 14, wherein the short word length is 18 bits and the long word length is 36 bits.

26. A multiplication circuit comprising:
a register file which is adapted to store data words of a first length N;
a multiplier which is adapted to multiply together data words of a second length 2N, wherein the second length is twice the first length;
a first register that stores N bits and that has an output coupled with a first 2N-bit input of the 2N-bit multiplier;
a second register that stores N bits and that has an output coupled with a second 2N-bit input of the 2N-bit multiplier;
a first and a second 2N-bit accumulation unit, each having an input connected to an output of the 2N-bit multiplier,
wherein, in a first mode of operation for multiplying two words of the first length;
first and second data words of the first length are retrieved from the register file, respectively stored in the first and second registers, and are converted to first and second data words of the second length, and
the first and second data words of the second length are multiplied together in said multiplier to form a result of length two times the second length, and
wherein, in a second mode of operation for multiplying two words of the second length;
third and fourth data words of the first length are retrieved from the register file and are respectively stored in the first and second registers,
fifth and sixth data words of the first length are retrieved from the register file,
the third and fifth data words of the first length are combined to form a third data word of the second length, the fourth and sixth data words of the first length are combined to form a fourth data word of the second length, and the third and fourth data words of the second length are multiplied together in said multiplier to form a result of length two times the second.

27. A multiplication circuit as claimed in claim 26, wherein, in the second mode of operation, the fifth and sixth data words of the first length are stored in respective multiplication registers after retrieval from the register file.

28. A multiplication circuit as claimed in claim 26, further comprising first and second accumulators, each of at least the second length, for receiving the multiplication results from said multiplier.

29. A multiplication circuit as claimed in claim 28, wherein, in the second mode, the result of multiplying together the third and fourth data words of the second length can be divided between the first and second accumulators.

30. A multiplication circuit as claimed in claim 28, wherein, in the second mode, a selected part of the result of multiplying together the third and fourth data words of the second length can be stored in a selected one of the first and second accumulators.

31. A multiplication circuit as claimed in claim 26, wherein the first length is 16 bits and the second length is 32 bits.

32. A multiplication circuit as claimed in claim 26, wherein the first length is 18 bits and the second length is 36 bits.

33. A multiplication circuit as claimed in claim 1, wherein the first 2N-bit accumulation unit receives the 2N most significant bits from the 2N-bit multiplier, and wherein the second 2N-bit accumulation unit receives the 2N least significant bits from the 2N-bit multiplier.

34. A multiplication circuit as claimed in claim 1, further comprising:

a third register that stores N bits and that has an output coupled with the first 2N-bit input of the 2N-bit multiplier, wherein the third register stores the second word of the first pair of short word length words;

a fourth register that stores N bits and that has an output coupled with the second 2N-bit input of the 2N-bit multiplier, wherein the fourth register stores the second word of the second pair of short word length words;

two first multiplexers having respective outputs connected to respective inputs of the third and fourth registers;

two second multiplexers having respective outputs connected to a first input of a respective first multiplexer and connected to an input of the first and second registers, respectively; and two third multiplexers having respective outputs connected to a second input of a respective first multiplexer.

35. A multiplication circuit as claimed in claim 1, further comprising:

two first multiplexers having respective outputs connected to the first 2N-bit input of the 2N-bit multiplier and the second 2N-bit input of the 2N-bit multiplier, respectively;

two second multiplexers having respective outputs connected to the first 2N-bit input and the second 2N-bit input, respectively, and connected to a first input of a respective first multiplexer;

two third multiplexers having respective outputs connected to an input of the first and second register, respectively, wherein an output of the first register is connected to a second input of a first multiplexer, and wherein an output of the second register is connected to a second input of the other first multiplexer.

* * * * *

UNITED STATES PATENT AND TRADEMARK OFFICE
CERTIFICATE OF CORRECTION

PATENT NO.      : 7,587,443 B1                                    Page 1 of 1
APPLICATION NO. : 10/807796
DATED           : September 8, 2009
INVENTOR(S)     : Martin Langhammer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this

Twenty-first Day of September, 2010

David J. Kappos
*Director of the United States Patent and Trademark Office*